United States Patent
Ionescu et al.

(10) Patent No.: US 8,184,633 B2
(45) Date of Patent: May 22, 2012

(54) AUTOMATED INTEROPERABILITY ASSESSMENTS BASED ON ITERATIVE PROFLING AND EMULATION OF SIP OR T.38 FAX-RELAY ENABLED DEVICES

(75) Inventors: Alexandru Ionescu, Bucuresti (RO); Christian-Ionut Lup, Bucuresti (RO)

(73) Assignee: Zoltes, Inc., Anderson, SC (US)

( * ) Notice: Subject to any disclaimer, the term of this patent is extended or adjusted under 35 U.S.C. 154(b) by 453 days.

(21) Appl. No.: 12/580,248

(22) Filed: Oct. 15, 2009

(65) Prior Publication Data
US 2010/0091679 A1    Apr. 15, 2010

Related U.S. Application Data

(60) Provisional application No. 61/105,558, filed on Oct. 15, 2008.

(51) Int. Cl.
*H04L 12/28* (2006.01)
*H04L 12/56* (2006.01)

(52) U.S. Cl. .......... 370/392; 370/389; 370/395.21; 370/401; 358/426.11; 358/426.12; 358/426.13; 358/426.14

(58) Field of Classification Search .......... 370/389, 370/392, 401, 395.21; 379/220.01, 225, 379/229; 358/1.15, 400–401, 403, 407, 426.11–426.16, 358/435, 436
See application file for complete search history.

(56) References Cited

U.S. PATENT DOCUMENTS

| | | | |
|---|---|---|---|
| 2005/0249196 A1* | 11/2005 | Ansari et al. | 370/352 |
| 2009/0059918 A1* | 3/2009 | Spade et al. | 370/389 |
| 2010/0091679 A1* | 4/2010 | Ionescu et al. | 370/252 |

OTHER PUBLICATIONS

"Utilization of SIP Contact Header for Reducing the Load on Proxy Servers in FoIP Application"; 2009 First International Conference on Computational Intelligence, Communications Systems and Networks, Jul. 23-25, 2009; Sarvakar, K.J. ; Amin, K. ; Patel, R. ; Patel, M. ; Maheta, K. ; Patel, B.*

"Using T.38 and SIP for real-time fax transmission over IP networks "; 26th Annual IEEE Conference on Local Area Networks, 2001; Nov. 14-16, 2001; Choudhary, U. ; Perl, E. ; Sidhu, D.*

* cited by examiner

*Primary Examiner* — Kwang B Yao
*Assistant Examiner* — Benjamin H. Elliot, IV
(74) *Attorney, Agent, or Firm* — Overhauser Law Offices, LLc

(57) ABSTRACT

A system for and method of efficient interoperability assessment based on automated Behavioral Profiling and Emulation of SIP or T.38 Fax-relay Enabled Devices, for example, for profiling and emulating VoIP Phones such as SIP Phones, or T.38 Fax-relay devices such as Internet Aware Fax Terminals. The method includes a Multi-step/Multi-technology Iterative Profiling Stage that allows creating a Behavioral Profile based on the analysis of a plurality of traffic samples. Also, the method presents an efficient process of Device Emulation of an actual device to be used in interoperability assessment, including a Standard State Machine parameterized by a set of characteristics stored in the Behavioral Profile. The Emulation method can be used to duplicate one or more device behaviors exhibited either by different firmware revisions, software upgrades or by different OEM product models.

8 Claims, 20 Drawing Sheets

NOTE: * Tones, Voice, Video, Fax

NOTE: * Tones, Voice, Video, Fax. Emulated media refers only to T.30/T.38 fax

NOTE: * Tones, Voice, Video, Fax. Emulated media refers only to T.30/T.38 fax

| Message Syntax and Content Deviations | Message Flow Sequence Deviations | Other exceptions relative to IETF standards |
|---|---|---|

FIG. 5A

| T.30/T.38 Signal Parameters and Content Deviations | T.30/T.38 Signal Flow Deviations |
|---|---|
| Signal Timing (min, max, average, std. deviation) | Other exceptions relative to ITU-T standards |

FIG. 5B

NOTE: * Tones, Voice, Video, Fax. Emulated media refers only to T.30/T.38 fax

SIP Configuration Editor

[CCM198]

Execution Settings

| | |
|---|---|
| Channels Count: | 1 |
| Iterations: | 90000 |
| Test Session Failed If Failed Iterations (%) > | 10 |
| User Rate: | No |
| Rate: | 0 |
| Log Level: | All |
| Log Filter: | Test Info SIP RTP |

SIP Settings

| | |
|---|---|
| Phone Type: | PolyconSoundPointIP-SPIP 650-UA firm |
| Register Before: | No |
| Domain: | 192.168.168.198 |
| Domain Port: | 5060 |
| Use Auth: | Yes |
| Auth ID: | "200006" |
| Auth Password: | "200006" |
| Display Name: | "200006" |
| User Name: | "200006" |
| User IP: | 192.168.168.223 |
| User Port: | 9060 + n ch |

RIP Settings

| | |
|---|---|
| RTP Port: | 5000 + n ch * 3 |
| Always Enable Inband DTMF Detection: | |

SIP Addresses

| | |
|---|---|
| Endpoint A: | "200005" |
| Endpoint B: | |
| Endpoint C: | |
| Endpoint D: | |
| Endpoint E: | |
| Endpoint F: | |

| Endpoint | 200006@192.168.168.223:9... | | Iteration | 1 | Test Info SI. |
|---|---|---|---|---|---|

| Time | From | To | Packet |
|---|---|---|---|
| 0 | | | Iteration Started! |
| 0 | | | Command 'Register' Started |
| 10 | 200006 | 192.168.168.198 | Register sip: 192.168.168.198:5060 |
| 10 | 192.168.168.198 | 200006 | 100 Trying |
| 140 | 192.168.168.198 | 200006 | 401 Unauthorized |
| 140 | 200006 | 192.168.168.198 | REGISTER sip: 192.168.168.198:5060 |
| 140 | 192.168.168.198 | 200006 | 100 Trying |
| 140 | 192.168.168.198 | 200006 | 200 OK |
| 150 | 200006 | 192.168.168.223 | NOTIFY sip: 200006@192.168.168.223:9060 |
| 150 | 192.168.168.223 | 200006 | 200 OK |
| 150 | | | Command ended! The result is Passed! |
| 150 | | | Command 'Make Call' started! |
| 150 | 200006 | 200005 | INVITE sip:200005@192.168.168.198:5060;user=phone |
| 150 | 200005 | 200006 | 100 Trying |
| 291 | 200005 | 200006 | 180 Ringing |
| 501 | 200005 | 200006 | 183 Session Progress |
| 501 | 200005 | 200006 | 200 OK |
| 501 | 200006 | 200005 | PRACK sip:200005@192.168.168.198 |
| 501 | 200006 | 200005 | ACK sip:200005@192.168.168.198 |
| 501 | 200005 | 200006 | 200 OK |
| 501 | | | Command Ended! The result is Passed! |
| 501 | | | Command 'Play Voice' started! |
| 5999 | 200006 | 200005 | BYE sip: 200005@192.168.168.198 |
| 6009 | 200005 | 200006 | 200 OK |
| 6009 | | | Iteration Ended! The result is Passed! |

FIG. 11

| Endpoint | 200006@192.168.168.207:9.... | | Iteration | 1 | | Test Info SI | |
|---|---|---|---|---|---|---|---|

| Time | From | To | Packet |
|---|---|---|---|
| 0 | | | Iteration Started! |
| 0 | | | Command 'Register' Started |
| 5 | 200006 | 192.168.168.198 | Register sip: 192.168.168.198:5060 |
| 7 | 192.168.168.198 | 200006 | 100 Trying |
| 120 | 192.168.168.198 | 200006 | 401 Unauthorized |
| 120 | 200006 | 192.168.168.198 | REGISTER sip: 192.168.168.198:5060 |
| 124 | 192.168.168.198 | 200006 | 100 Trying |
| 127 | 192.168.168.198 | 200006 | 200 OK |
| 128 | 200006 | 192.168.168.207 | NOTIFY sip: 200006@192.168.168.207:9060 |
| 129 | 192.168.168.223 | 200006 | 200 OK |
| 129 | | | Command ended! The result is Passed! |
| 129 | | | Command 'Make Call' started! |
| 130 | 200006 | 200005 | INVITE sip:200005@192.168.168.198:5060;user=phone |
| 133 | 200005 | 200006 | 100 Trying |
| 144 | 200005 | 200006 | 404 Not Found |
| 145 | 200006 | 200005 | ACK sip:200005@192.168.168.198:5060;user=phone |
| 145 | | | Command ended! The result is Failed! |
| 145 | | | Command 'Deregister' started! |
| 146 | 200006 | 192.168.168.198 | REGISTER sip:192.168.168.198:5060 |
| 148 | 192.168.168.198 | 200006 | 100 Trying |
| 149 | 192.168.168.198 | 200006 | 200 OK |
| 149 | | | Command ended! The result is Passed. |
| 149 | | | Iteration Ended! The result is Failed! |

FIG. 12

AUTOMATED INTEROPERABILITY ASSESSMENTS BASED ON ITERATIVE PROFILING AND EMULATION OF SIP OR T.38 FAX-RELAY ENABLED DEVICES

CROSS-REFERENCE TO RELATED APPLICATIONS

This application is a nonprovisional of and claims the benefit of U.S. Patent Application No. 61/105,558, filed Oct. 15, 2008, and titled Automated Interoperability Assessments Based on Statistical Emulation of IP Phones, which is incorporated herein by reference.

COPYRIGHT NOTICE

A portion of the disclosure of this patent document contains material which is subject to copyright protection. The applicant has no objection to the facsimile reproduction by anyone of the patent disclosure, as it appears in the US Patent and Trademark Office files or records, but otherwise reserves all applicant's copyrights whatsoever.

FIELD OF THE INVENTION

The present invention relates to systems providing interoperability assessment of telecommunications equipments and services, and in particular, to systems that assess the interoperability between Voice over Internet Protocol ("VoIP") and Fax over Internet Protocol ("FoIP") Communication Platforms (e.g. Session Initiation Protocols ("SIP") and Fax-relay ("T.38"), such as SIP Softswitches, SIP IP-PBXs, SIP Call Managers, Media Gateways, and the like) and a broad set of SIP or T.38 Fax-relay Enabled Devices.

BACKGROUND AND SUMMARY

Enterprises and Service Providers are now typically migrating their services and equipment to Voice over Internet Protocol ("VoIP"). Present VoIP Communications Systems offer customers both a rich set of advanced features and the ability to quickly add new functionalities as the requirements on the market change and grow.

IP Private Branch Exchanges ("PBXs") in particular have gained strong traction in the marketplace and their deployments outpace the traditional time division multiplexing ("TDM") PBX deployments. Also, Service Providers are now quickly developing their network nodes using VoIP to increase productivity and deploy new services.

The Telephony Network Manufacturers ("TEMs"), Network Equipment Manufacturers ("NEMs"), and the Service Providers ("SPs") have largely reached a consensus that the Session Initiation Protocol ("SIP") is the most appropriate protocol choice to use in the VoIP world. Conversely, selecting the SIP protocol alone to implement VoIP features and services is not enough. As long as a large family of Internet Engineer Task Force Requests for Comments ("IETF", "RFCs") exists, the SIP implementations offered by many TEMs, NEMs and SPs rarely implies support of all related RFCs or even the entire functionality stated into a specific RFC. Moreover, there are often multiple ways of achieving the same technical result in SIP, a fact that further complicates interoperability with other third-party SIP devices and services.

The legacy facsimile technology is still in use even the medium and large enterprises are finding that scanning documents and sending them as PDFs files can successfully replace the old fax machines. The regulatory requirements continue to make the facsimile documents imperative; therefore, many businesses continue to send and receive hard documents using legacy technology. Nowadays, companies are trying to minimize the telephony hardware costs by relying on SIP trunks to connect to the service provider's networks that terminate the calls onto the PSTN (Public Switched Telephone Network). This natural shift to IP services requires that the Service Provider IP backbone must be T.38-compatible in order to have interoperable fax-relay endpoints in every call.

The most important challenge TEMs, NEMs and SPs are confronting is the interoperability assessment between their IP products and the third-party products they have to interoperate with. As shown in FIG. 1, usually this is accomplished by using actual IP telecom devices and services, provided by the third-party manufacturers, directly connected to their products in a lab. This approach becomes very expensive as long as multiple third-party devices and services are required for a comprehensive interoperability assessment. Such testing is labor intensive, expensive, requires complex test beds, and often results in an incomplete assessment.

As a practical matter, many testing facilities do not have the resources to purchase all of the third-party IP network equipment designed to interact with target IP telecom products. This can lead to instances where the IP telecom product cannot be adequately assessed for interoperability before being released to market. Accordingly, it is desirable to provide a method for emulating third-party IP telecom devices and services that a IP telecom product is intended to interact with so that the product can be tested without having to purchase an expensive and numerous set of third-party IP devices and services, for example SIP or T.38 Fax-relay Enabled Devices and services.

Another problem of the interoperability assessment is that every feature provided by the IP telecom product is tested for interoperability one-by-one, often manually, thus causing the entire task to be very labor-intensive. Therefore, due to the amount of time required and the costs involved, it is critical to automate the interoperability assessment in the lab.

Another problem for TEMs, NEMs and SPs is that the IP telecom devices and services are upgraded periodically to add new features or to correct existing bugs. Whenever these types of changes are made to complex software systems, for example a IP target system telecom product, a tremendous risk exists that these changes or additions to the IP target system could corrupt its existing functionality, and inherently the interoperability with third-party IP telecom devices and services. This problem requires a comprehensive regressive interoperability assessment of the IP target system with all third-party IP devices and services it is designed to inter-work with. Again, due to the amount of time required, it is critical to automate the regressive interoperability assessment as much as possible.

The complete and precise emulation of actual devices and services is not a simple task for VoIP and FoIP protocols such as SIP and T.38. As mentioned above, TEMs, NEMs and SPs rarely offer support of all related standard recommendations in their SIP and T.38 fax-relay implementations. Moreover, they tend to add proprietary extensions, for example, as new features that affect the SIP protocol messages syntax and content, even the message flow. Consequently, an effective system and method for emulating the actual device and service behaviors necessarily includes all these "deviations" alongside the IETF and ITU-T standard specifications.

The communications devices and services exhibit different response delays for different inputs implied by both the traffic load and the intrinsic processing algorithms efficiency. Again, a successful method and system for emulating an actual device and service must replicate, for example, the T.30/T.38 signal timing of the T.38 Fax-relay device that is being emulated. For example, multiple time measurements are considered and processed according to a statistical model due to stochastic characteristic of the IP environment.

Another important challenge for proper emulation of the actual IP telecom device and service behavior is the automated analysis of real-life telecom traffic generated by the target system, for example, to extract the deviations for SIP traffic against the IETF standard specifications or T.38 Fax-relay traffic against the related ITU-T recommendations. For example, the full set of features of an actual SIP device and service must be exercised and the related traffic stored for complete analysis. Once an automated analysis is done and the set of deviations identified, they can be stored as a device and service behavioral profile along with the related message stamps for later use in the emulation stage.

The current invention comprises of an efficient method of interoperability assessment of IP Telecom Communications Platforms based on automated Behavioral Profiling and Emulation of real-life SIP enabled devices, for example, SIP phones or SIP Internet Aware Fax Terminals.

For effective interoperability assessment the presently disclosed system and method consists of two stages: (1) Behavioral Profiling using a Multi-Step/Multi-Technology Iterative Profiling process and (2) Device Emulation process.

An illustrative embodiment of the present disclosure includes a system for and method of efficient interoperability assessment based on automated Behavioral Profiling and Device Emulation of actual SIP or T.38 Fax-relay Enabled Devices, including device traffic analysis and generation of the associated Behavioral Profile, device message syntax/signal parameters and content analysis to generate the associated Behavioral Profile, device message/signal flow sequence analysis to generate the associated Behavioral Profile, device signal timing (timestamp) analysis to generate the associated Behavioral Profile. The system and method including a Multi-Step/Multi-Technology Iterative Profiling Stage of a actual SIP or T.38 Fax-relay Enabled Device, Device Emulation Stage of a actual device, generation of different actual telephony scenarios based on Behavioral Profiles, Device Emulation of multiple different actual SIP or T.38 Fax-relay Enabled Devices at the same time, and the ability to store and retrieve Behavioral Profiles into XML files or other database forms.

BRIEF DESCRIPTION OF THE DRAWINGS

FIG. 5A. SIP Behavioral Profile;

FIG. 5B. T.38 Fax-relay Media Behavioral Profile;

FIG. 9A. Interoperability Assessment Configuration GUI;

FIG. 11. Passed example of an Interoperability Assessment Results GUI;

FIG. 12. Failed example of an Interoperability Assessment Results GUI;

DETAILED DESCRIPTION

Figure 1:
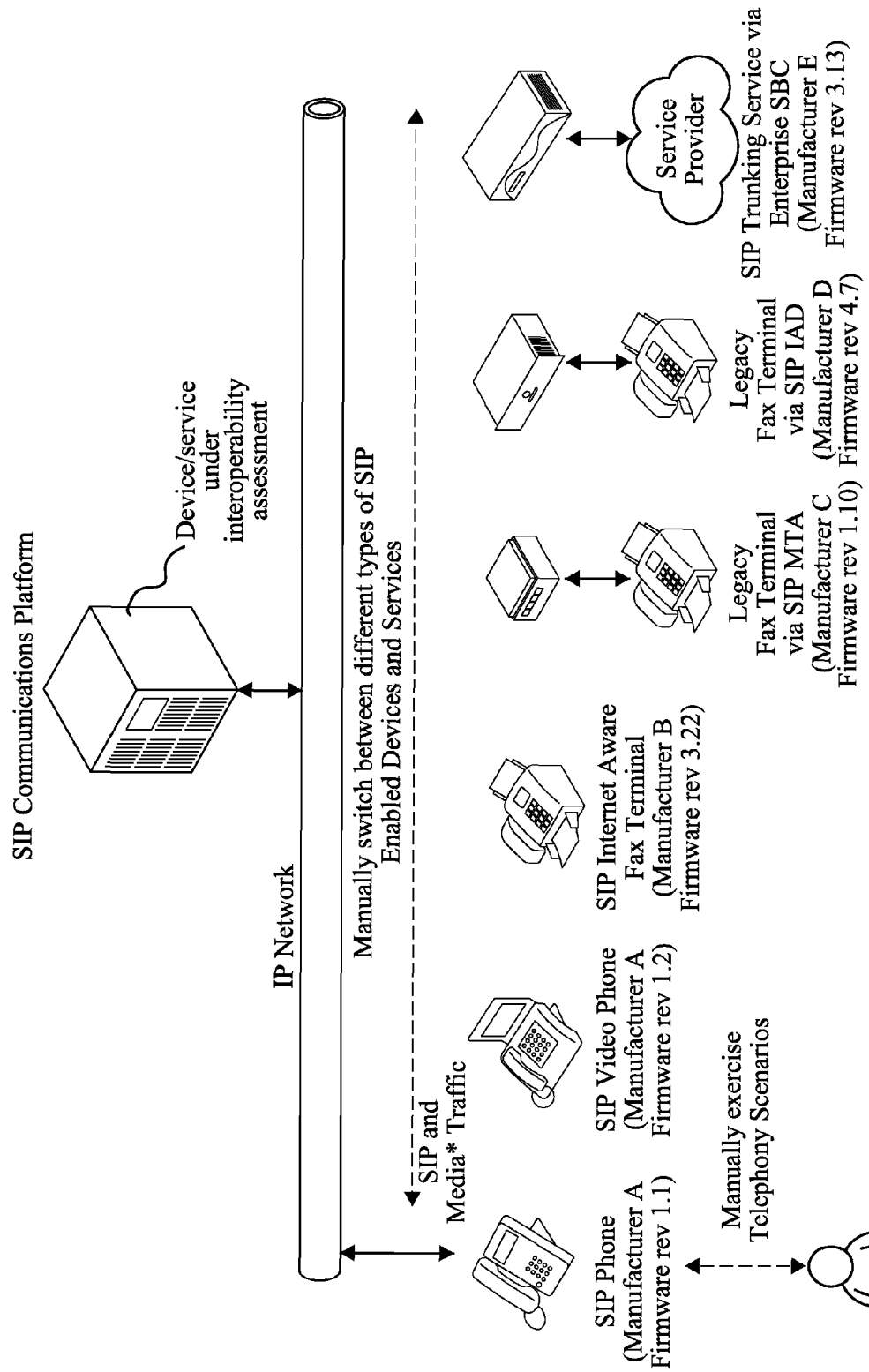
FIG. 1. Traditional approach of Interoperability Assessment of a Communications Platform using actual SIP or T.38 Fax-relay Enabled Devices.

Definitions used herein are as follows.

An "Interoperability Assessment" defines the process that verify the ability of systems (or units) to provide services or to accept services from other systems (or units) and to use the services exchanged to enable them to operate effectively together. For example, an Interoperability Assessment validates that a SIP Communications Platform properly interoperate with multiple SIP Phones having different firmware revisions, provided by various OEMs.

"Emulation" defines the process that simulates the functions of one system (or units) using a second system (or units), so that the second system (or units) behaves like and appears to be the first system (or units).

A "SIP or T.38 Fax-relay Enabled Device" refers to an IP network component that sets up, conducts and tears down SIP voice, video and fax calls. For example, typical implementations include SIP Phones, SIP Video Phones, SIP Internet Aware Fax Terminals, SIP Multimedia Terminal Adapters (MTAs), SIP Integrated Access Devices (IADs), and SIP Session Border Controllers.

A "phone" is a typical implementation of a VoIP User Agent (UA). Phones are implemented as hard phones or soft phones.

A "SIP Phone" is a typical implementation of a SIP User Agent (UA) that originates or terminates voice calls. SIP Phones are implemented as hard phones or soft phones.

A "SIP Video Phone" is a variant of a SIP User Agent (UA) that originates or terminates voice and video calls. SIP Video Phones are implemented as hard phones or soft phones.

A "SIP Internet Aware Fax Terminal" is a variant of a SIP User Agent (UA) that allows sending/receiving legacy facsimiles while connected directly to an IP network using T.38 (fax-relay) and T.30 communication protocols. SIP Internet Aware Fax Terminals are implemented as hard appliances.

A "SIP MTA (Multimedia Terminal Adapter)" is a variant of a SIP User Agent (UA) providing the conversion interface between the analog PSTN terminals and an IP network for voice, video and fax calls. SIP MTAs are implemented as hard appliances.

A "SIP IAD (Integrated Access Device)" is a variant of a SIP User Agent (UA) providing the conversion interface between the analog and/or digital PSTN devices and an IP network for voice, video and fax calls. SIP IADs are implemented as hard appliances.

A "SIP SBC (Session Border Controller)" is a device used in Voice over Internet Protocol (VoIP) networks that controls the SIP signaling and the media streams involved in setting up, conducting, and tearing down telephone calls or other communications services. The SIP SBCs are implemented as hard appliances.

"SIP Trunking" refers to the VoIP service offered by Internet Telephony Service Providers that enables the enterprise IP-PBXs to connect over SIP to PSTN cloud for voice and fax communication with mobile and fixed terminals.

A "User Agent" or UA, is the end-user device, used to create and manage a VoIP session. A UA has two main components, the User Agent Client (UAC) send messages and answers with VoIP responses, the User Agent Server (UAS) responds to VoIP requests sent by the peer. UAs may work in point to point mode.

A "SIP User Agent" or SIP UA, is the end-user device, used to create and manage a SIP session. A SIP UA has two main components, the User Agent Client (UAC) send messages and answers with SIP responses, the User Agent Server (UAS) responds to SIP requests sent by the peer. SIP UAs may work in point to point mode.

"T.30" refers to ITU-T T.30 recommendation—Procedures for document facsimile transmission in the general switched telephone network.

"T.38" refers to ITU-T T.38 recommendation—Procedures for real-time Group 3 facsimile communication over IP networks.

A "Communication Platform" is an IP network component or set of interconnected components that usually provides the functionality of a Proxy Server, a Registrar Server, a Redirect Server, and a Media Server. For example, typical implementations include SIP Softswitches, SIP IP-PBXs, SIP Call Managers, etc.

A "Behavioral Profile" is a set of characteristics a particular device, such as a SIP or T.38 Fax-relay Enabled Device, exhibits during the actual operation while connected to a Communications Platform, compared to standard functionality specifications, for example, the IETF SIP specifications. The Behavioral Profile of a SIP or T.38 Fax-relay Enabled Device includes particularities like Message/Signal Syntax and Content, Message/Signal Flow Sequence, Signal Timestamps (timing), and any other exceptions with regards to the standard recommendations. The Behavioral Profile is generated and populated during the Multi-step/Multi-technology Iterative Profiling process for a particular SIP or T.38 Fax-relay Enabled Device. The Behavioral Profile is used to modify the Standard State Machine during the Emulation Stage of the Interoperability Assessment proposed.

A "Multi-step Iterative/Multi-technology Profiling Stage" defines the process that gathers values for a characteristic in the Behavioral Profile of a SIP or T.38 Fax-relay Enabled Device by running a Telephony Scenario multiple times.

The "Device Emulation" refers to the emulation of a system using different behavioral characteristics of the system based on multiple observations.

A "Telephony Scenario" defines the set of actions the User has to perform during exercising a telephony feature (e.g. Make Call, Answer Call, Hold, Transfer, etc.). From the protocol point of view, the Telephony Scenario refers to the traffic exchanged between a phone and a Communications Platform while exercising a telephony feature.

For effective interoperability assessment the presently disclosed system and method consists of two stages: (1) Behavioral Profiling using a Multi-Step/Multi-technology Iterative Profiling process and (2) Device Emulation.

Behavioral Profiling Stage

Figure 2:
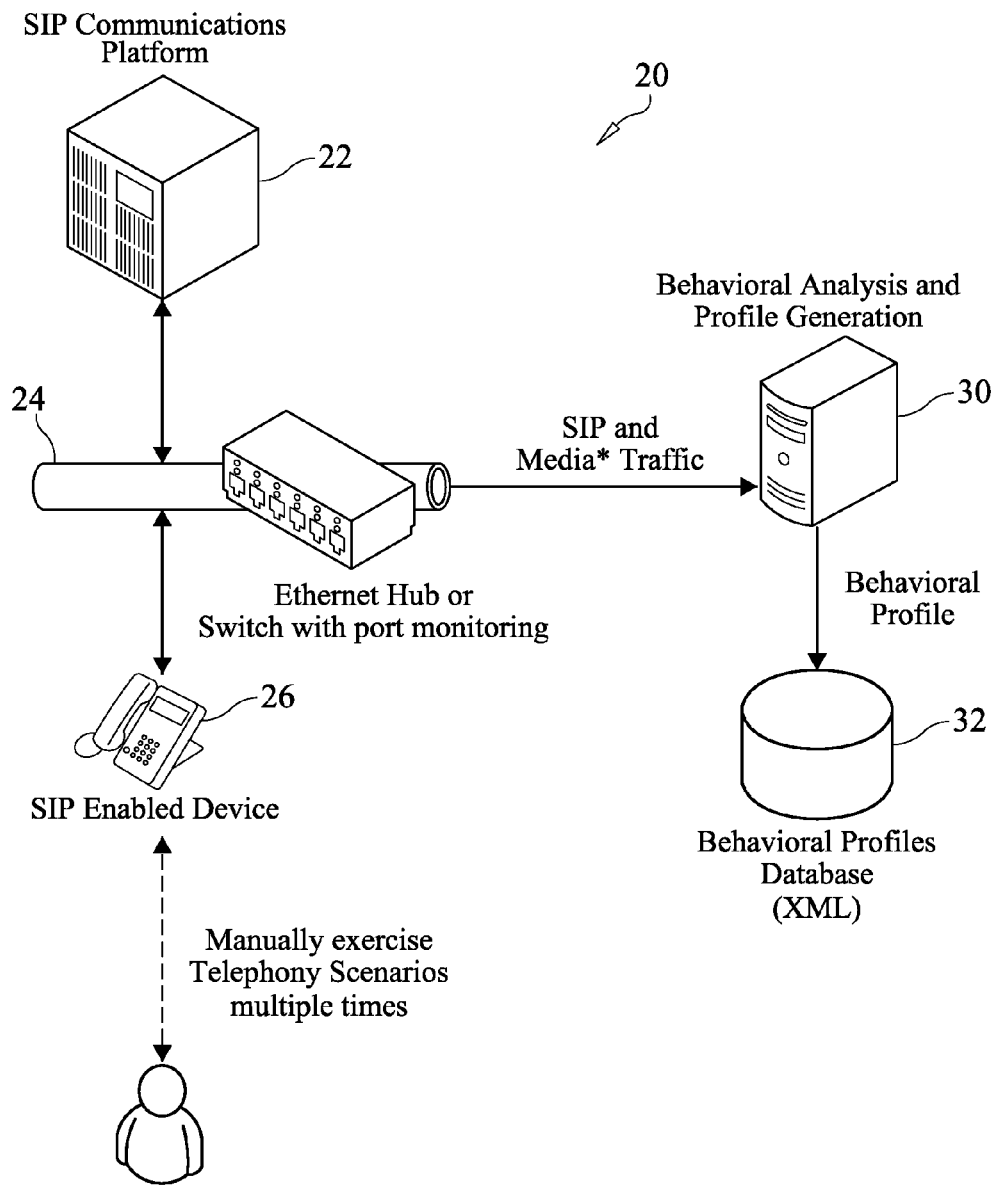
FIG. 2. Semi-automated Behavioral Profiling of an actual SIP Enabled Device.
Figure 6:
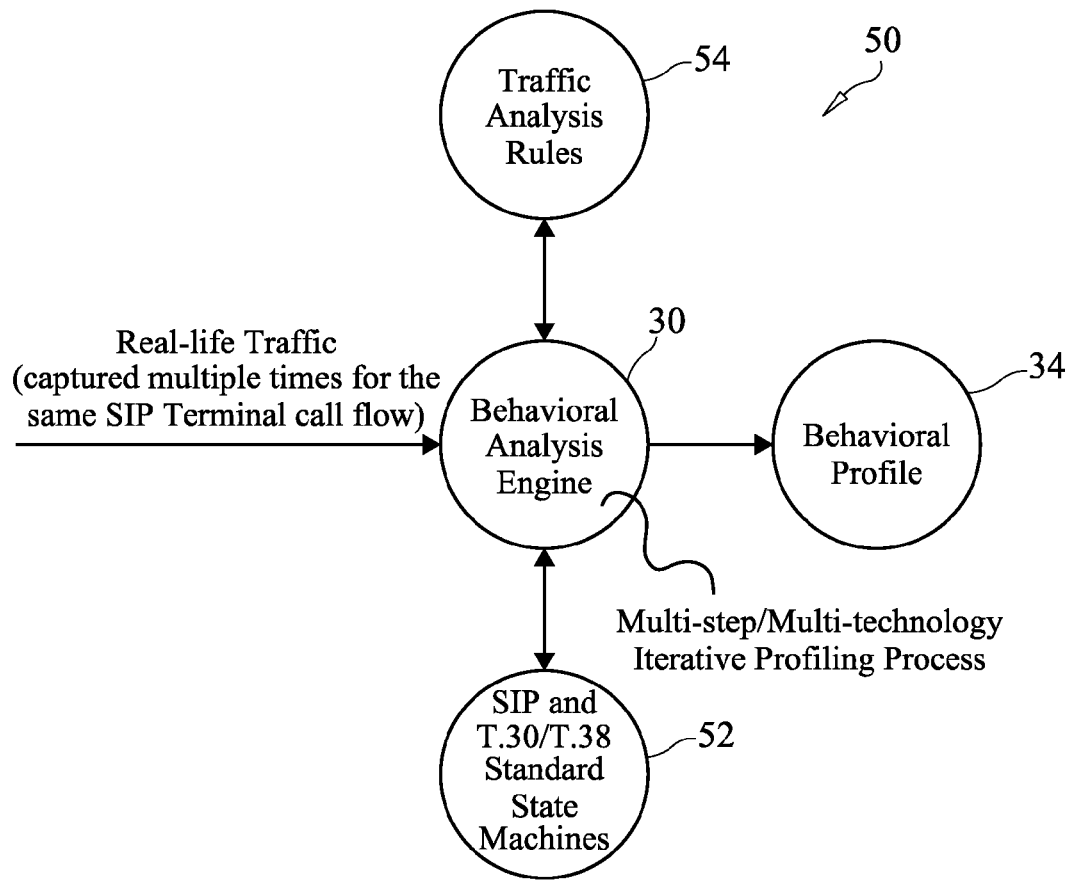
FIG. 6. Behavioral Profiling Stage.
Figure 7A:
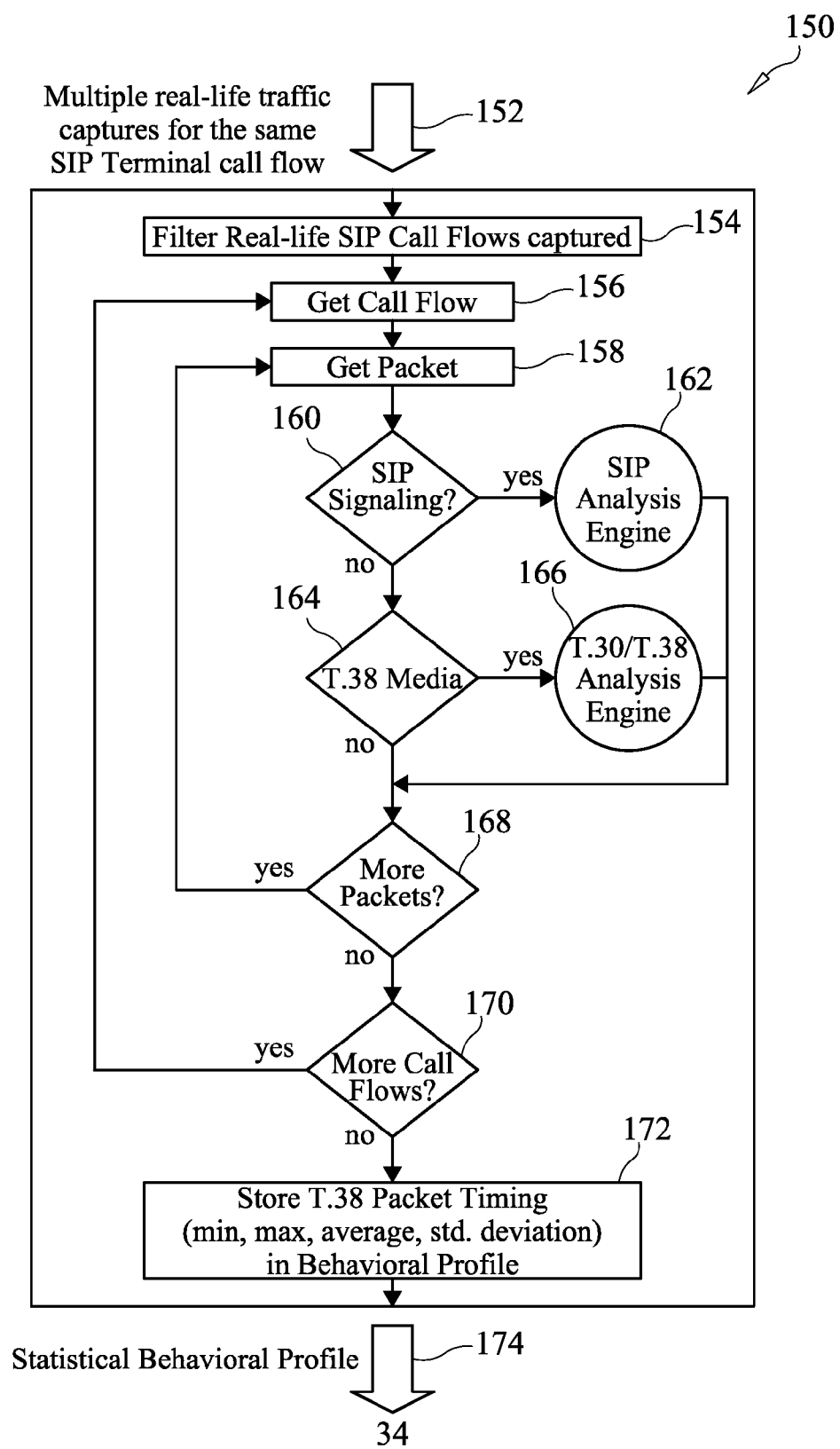
FIG. 7A. Behavioral Analysis Engine—Multi-step/Multi-technology Iterative Profiling Process.
Figure 7B:
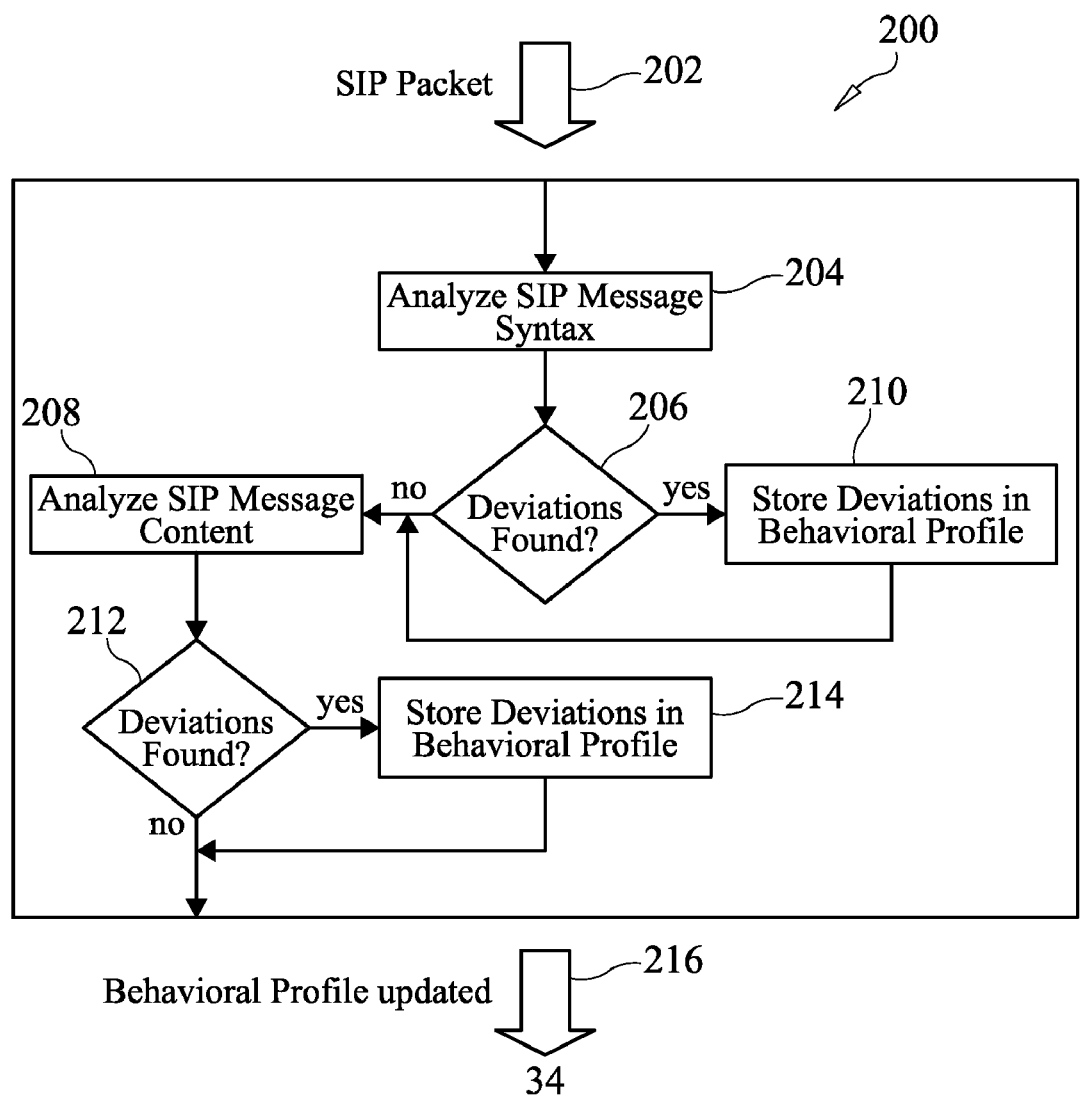
FIG. 7B. SIP Analysis Engine.
Figure 7C:
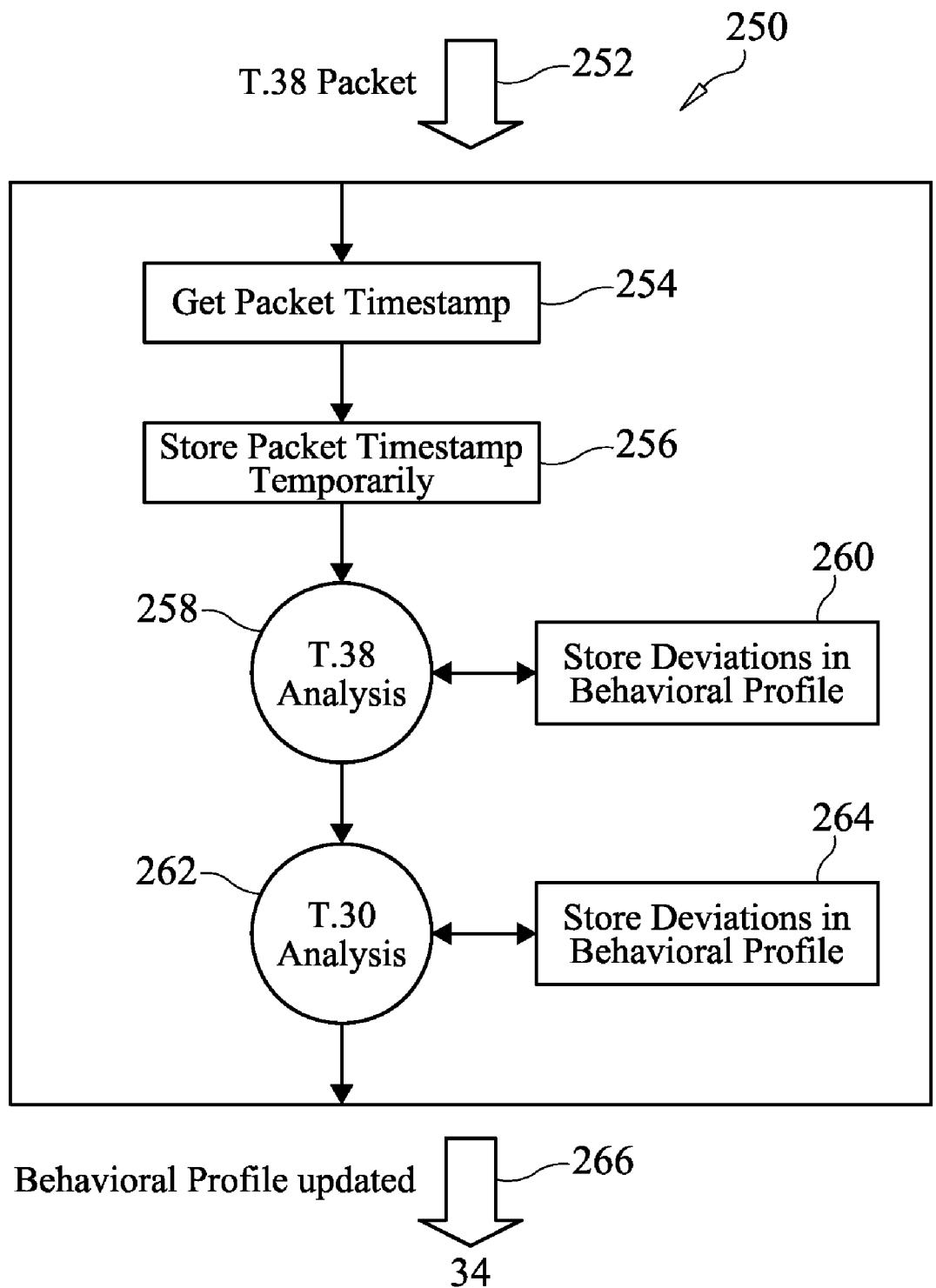
FIG. 7C. T.30/T.38 Analysis Engine.

During the first stage, a Behavioral Profile is generated for each SIP or T.38 Fax-relay Enabled or other device to be emulated for later interoperability assessment, for example, as shown in FIGS. 2 and 6. For example, emulated devices include those available from Cisco, Snom, and Polycom.

The Behavioral Profile is a set of behavioral characteristics a particular SIP or T.38 Fax-relay Enabled Device or other IP device exhibits during actual operation connected to a Communications Platform, compared to standard functionality specifications (Traffic Analysis Rules, FIG. 6), for example IETF standards. For example, the process observes and records deviations from the standard functionality specifications. The Behavioral Profile (FIGS. 5 & 6) includes particularities (associated with the Standard State Machine, FIG. 6) such as Message Syntax and Content, Message Flow Sequence, and any other exceptions with regard to the standards. For time sensitive protocols such as T.30/T.38, the Signal Timestamps (timing) are also stored in the Behavioral Profile for proper emulation of the actual device.

The Behavioral Profile is generated and populated during the Multi-step Iterative Learning process for a particular SIP or T.38 Fax-relay Enabled Device. The Multi-Step Iterative Profiling process, controlled by the Behavior Analysis Engine, FIG. 5, implies traffic analysis and gathering of behavioral values of a phone by exercising all its features using appropriate Telephony Scenarios. Multiple iterations of the same Telephony Scenario are used in order to create behavioral observations for the same phone feature.

For example, to develop various characteristics of the Behavior Profile, certain values, such as those shown in FIG. 5, to be measured are defined and a set of data is measured and collected for each of those variables. For example, various characteristics of the interaction traffic while an actual device and communication system are performing a particular function are measured. For example, measurements of a characteristic or set of characteristics is made for a plurality of interactions of a particular function of an actual device operating with a communication system. The process is repeated for other functions of the device and for other characteristics(s) relating to each other function.

The Behavioral Profiles are stored into a database for the second stage usage, for example as XML files.

Device Emulation Stage.

Figure 3:
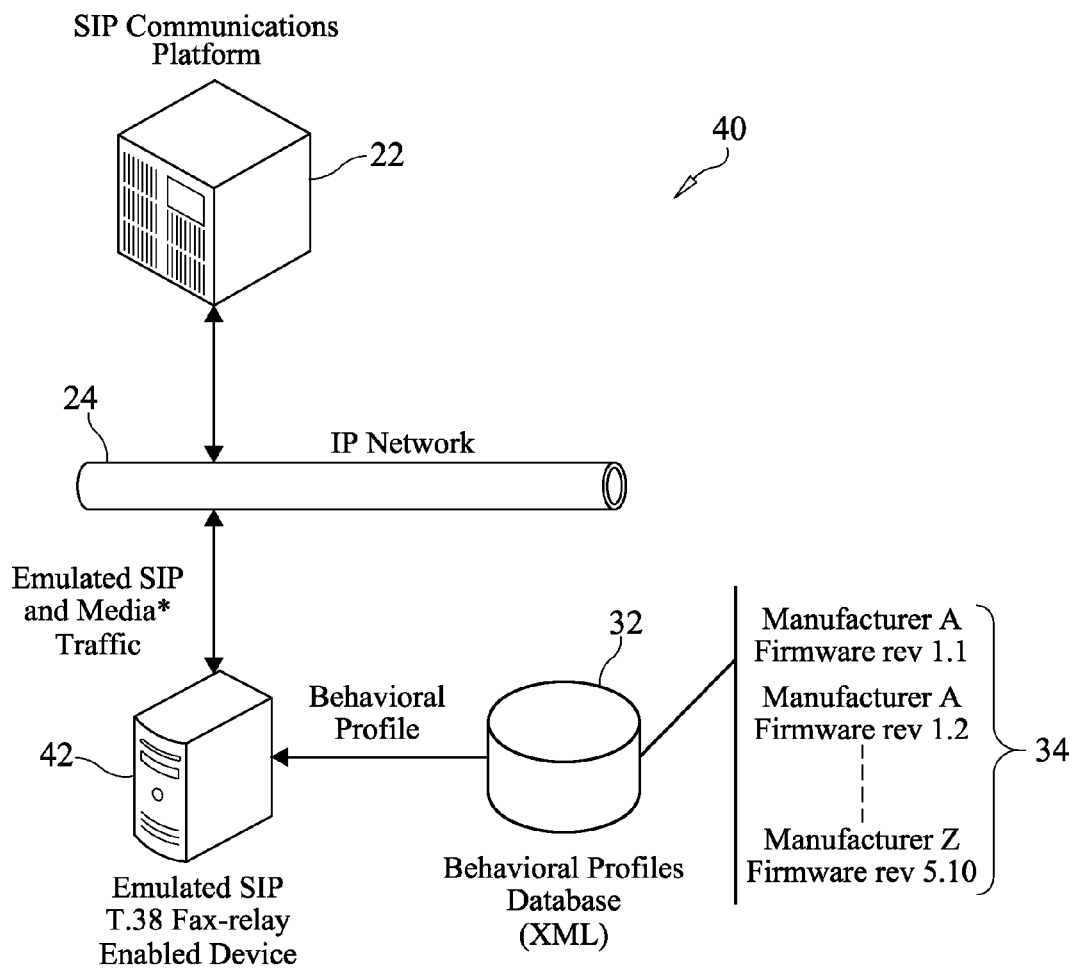
FIG. 3. Emulation of an actual SIP or T.38 Fax-relay Enabled Device.
Figure 4:
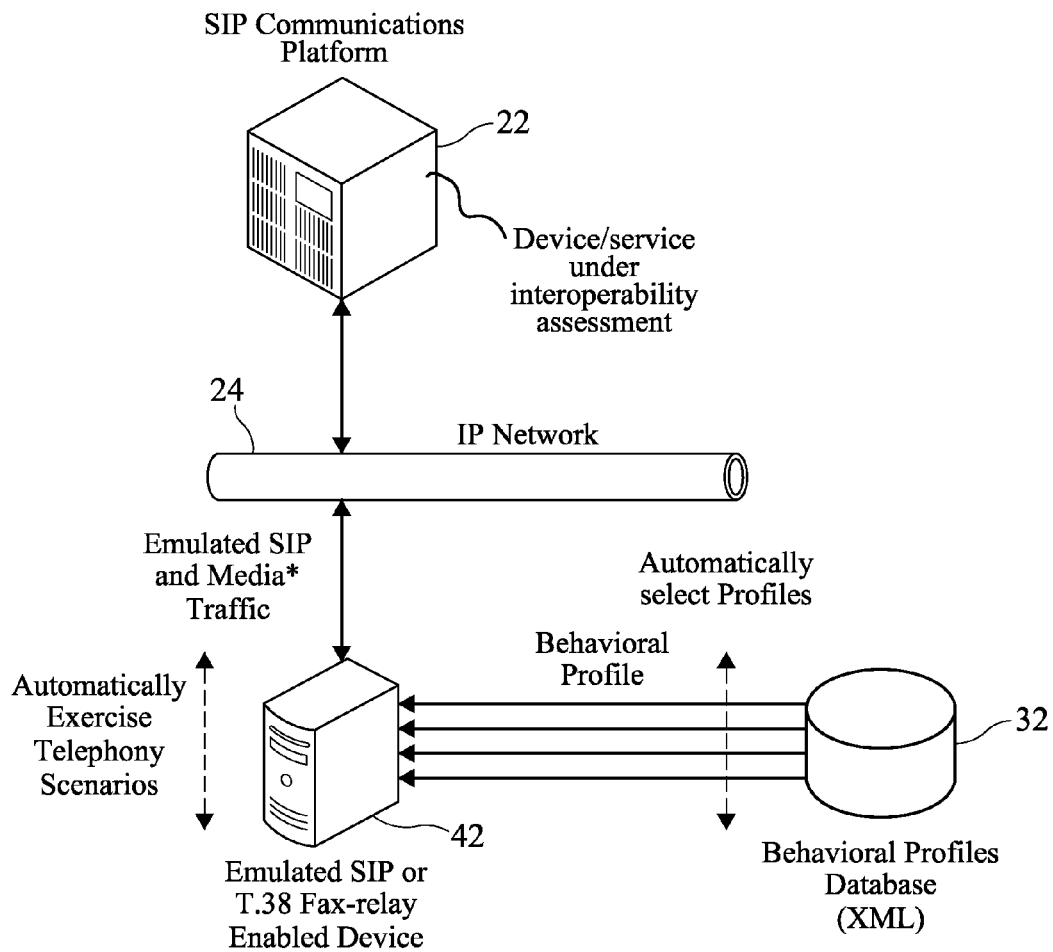
FIG. 4. Efficient approach of Interoperability Assessment of a Communications Platform using emulated SIP or T.38 Fax-relay Enabled Devices.
Figure 8A:
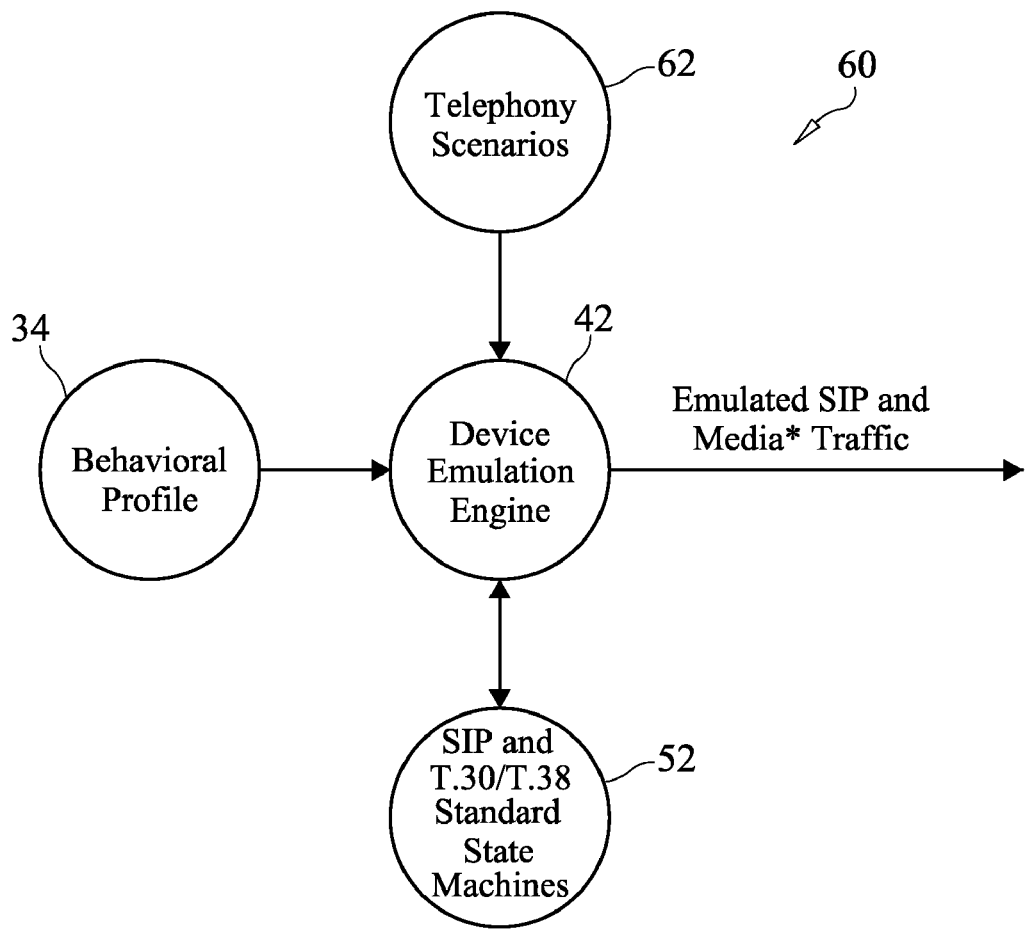
FIG. 8A. Device Emulation Stage.
Figure 8B:
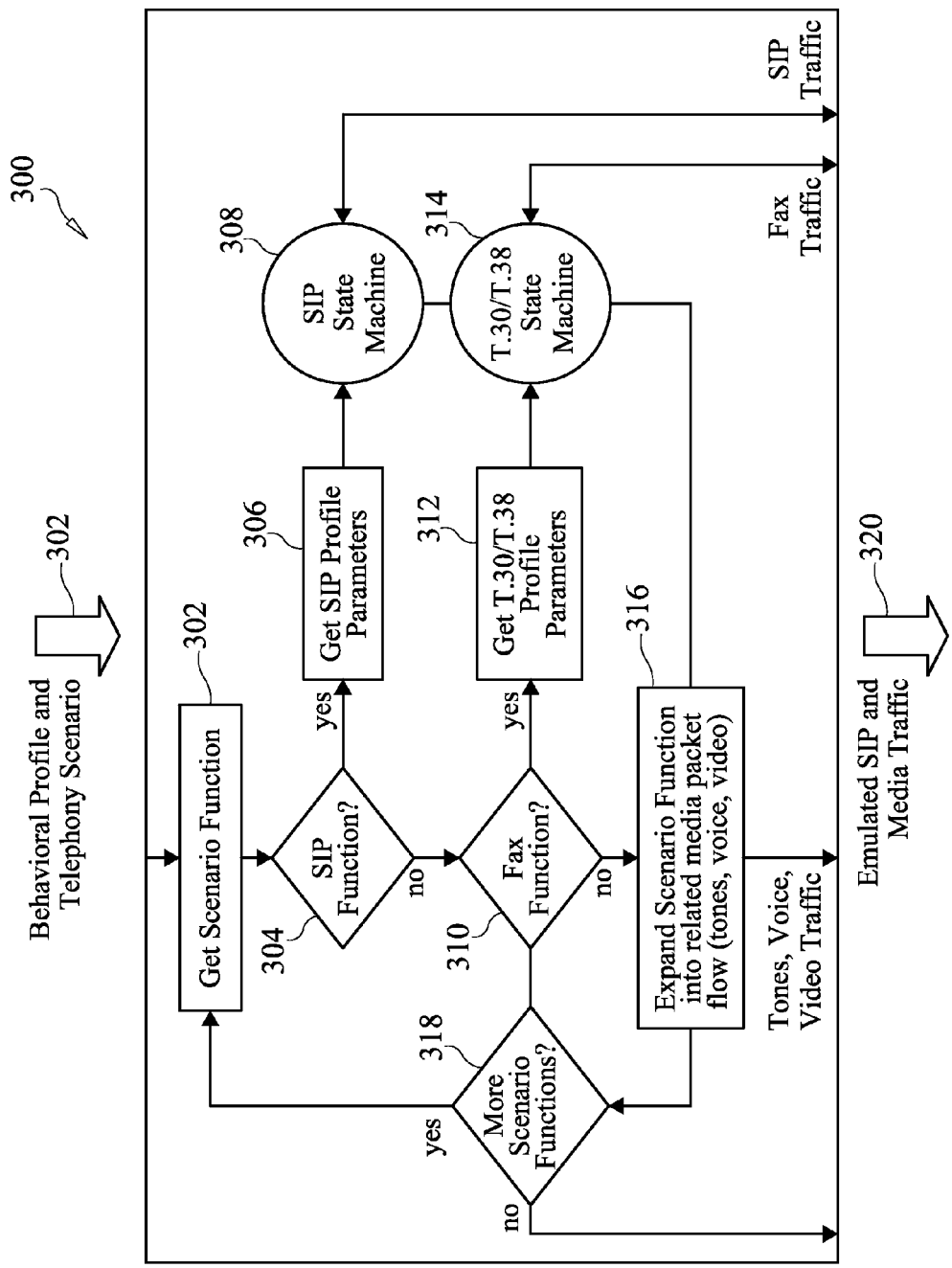
FIG. 8B. Device Emulation Engine.

During the second stage, shown in FIGS. 3, 4, and 8, the effective interoperability assessment of a Communications Platform versus multiple emulated SIP or T.38 Fax-relay Enabled Device is performed by using the Behavioral Profiles generated in the first stage.

The Device Emulation is performed using the behavioral characteristics determined in the first stage, and using different Telephony Scenarios (FIGS. 8A and 8B) that provide testing of the functions/services of the device(s) under emulation testing. For time sensitive data protocols such as T.30/T.38 (FIGS. 8A and 8B), a probabilistic distribution of the signal timing characteristics may be used for more realistic emulation of the actual T.38 Fax-relay Enabled Device, such as normal (Gaussian) distribution.

Figure 9B:
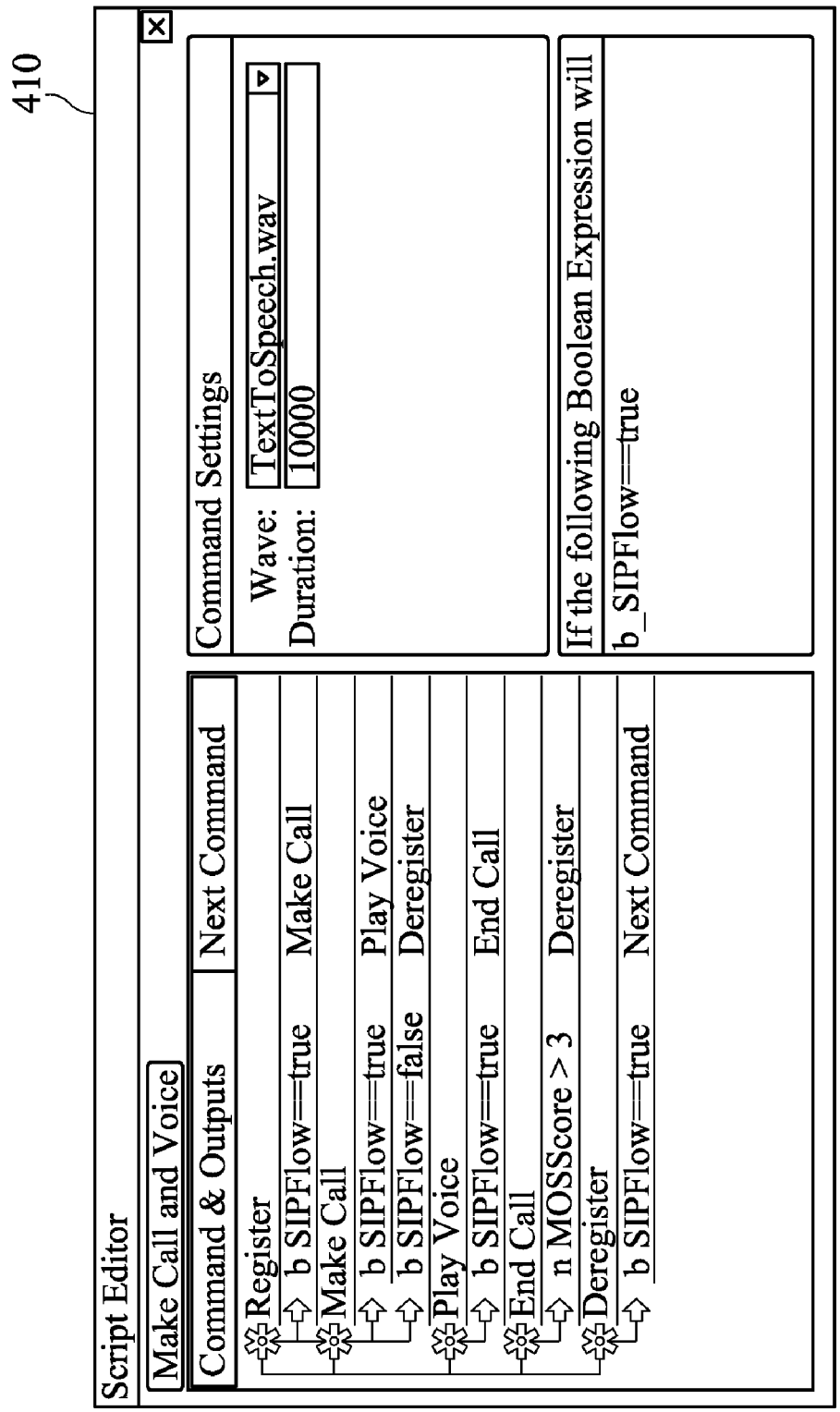
FIG. 9B. Telephony Scenario Editor.
Figure 10:
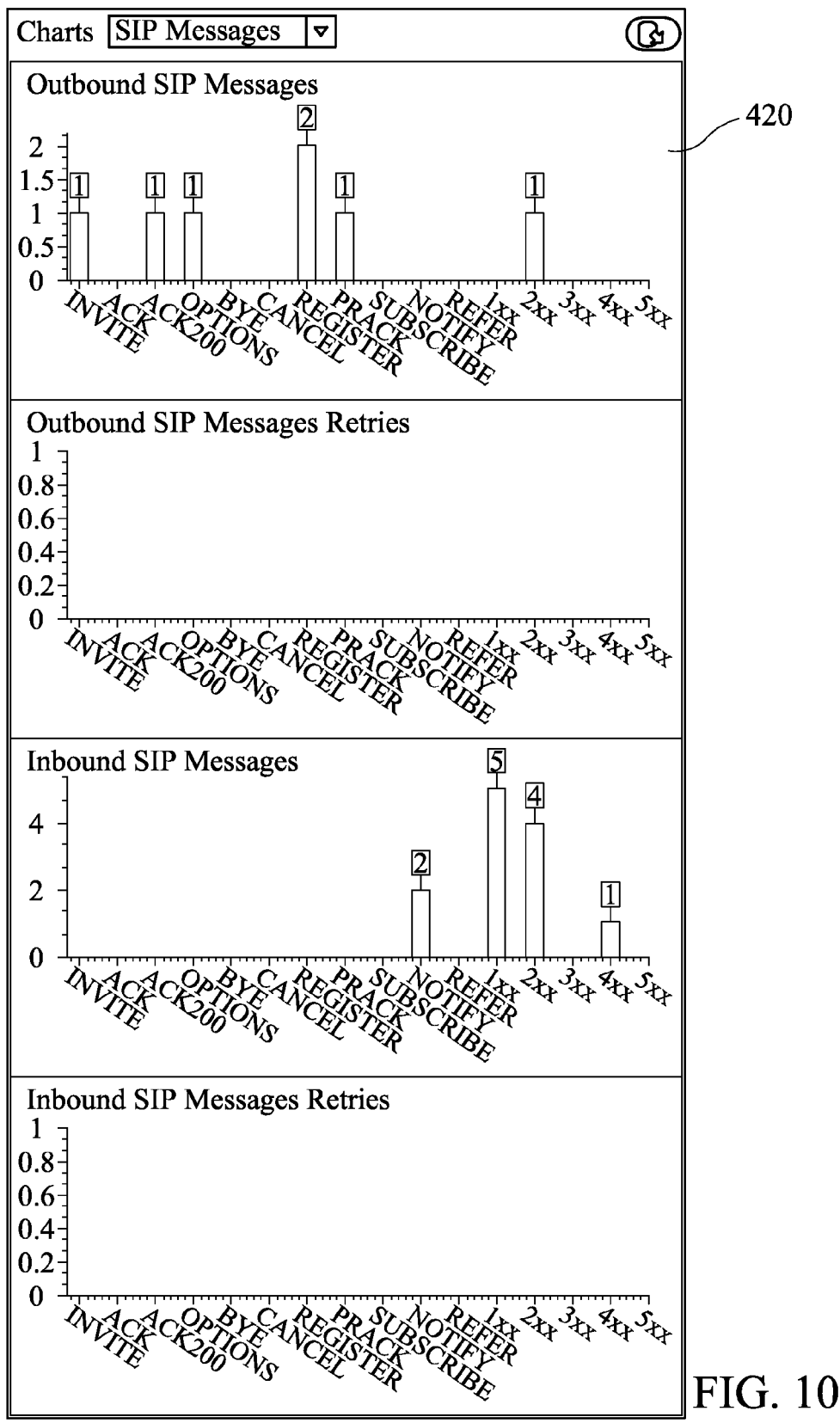
FIG. 10. Interoperability Assessment Real-time Monitoring GUI.

Referring to FIG. 9A, the present system and method provides for configuration for automated assessment, for example, including selection of a set of emulated devices to be included from the database of available device profiles, and predefined or custom telephony scenarios (call flows, commands, request messages, response messages, header fields, and the like) to include in the assessment (FIG. 9B). The present system and method also provides real-time monitoring of the assessment as shown in FIG. 10.

Figure 13A:
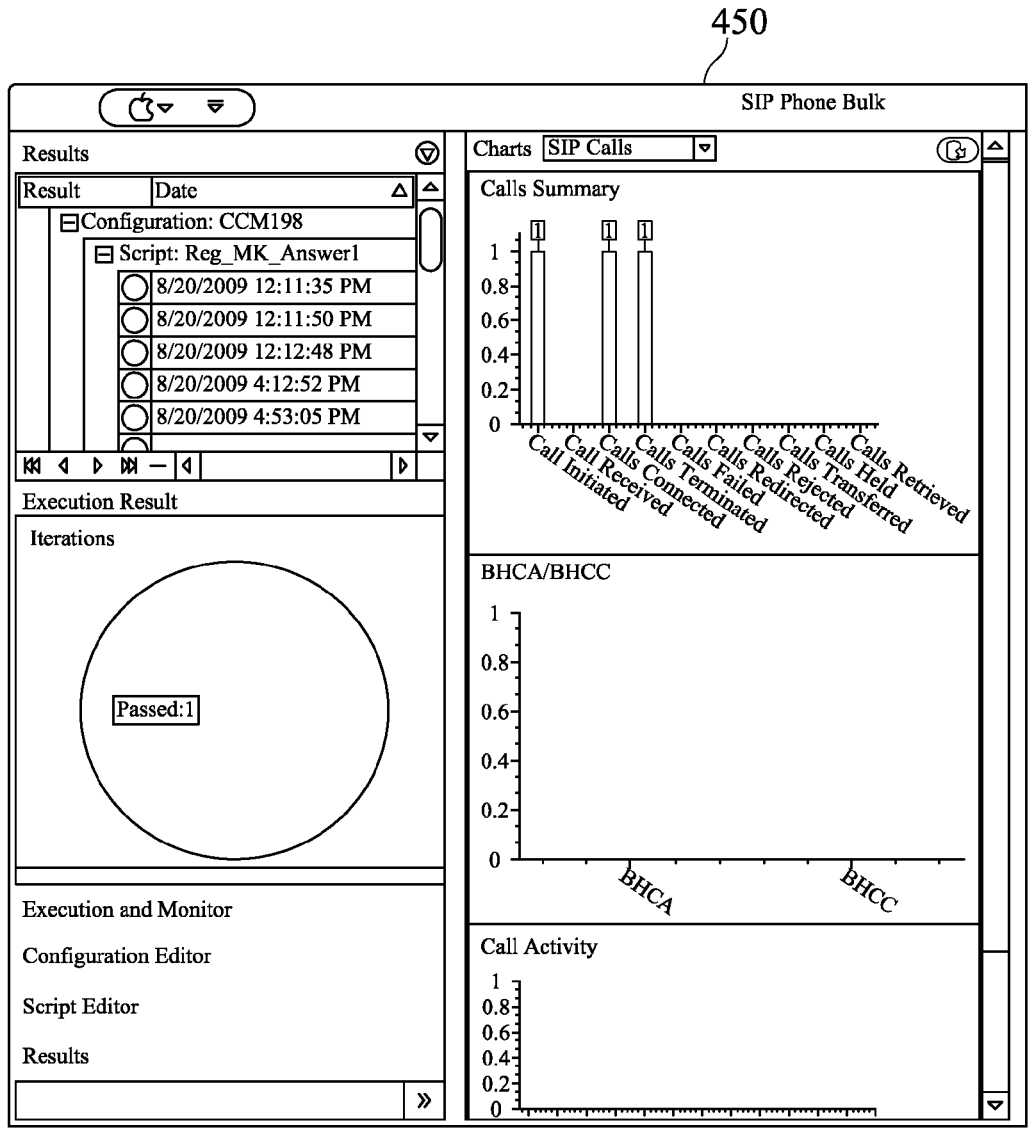
FIG. 13. Integration with existing test management application software.
Figure 13B:
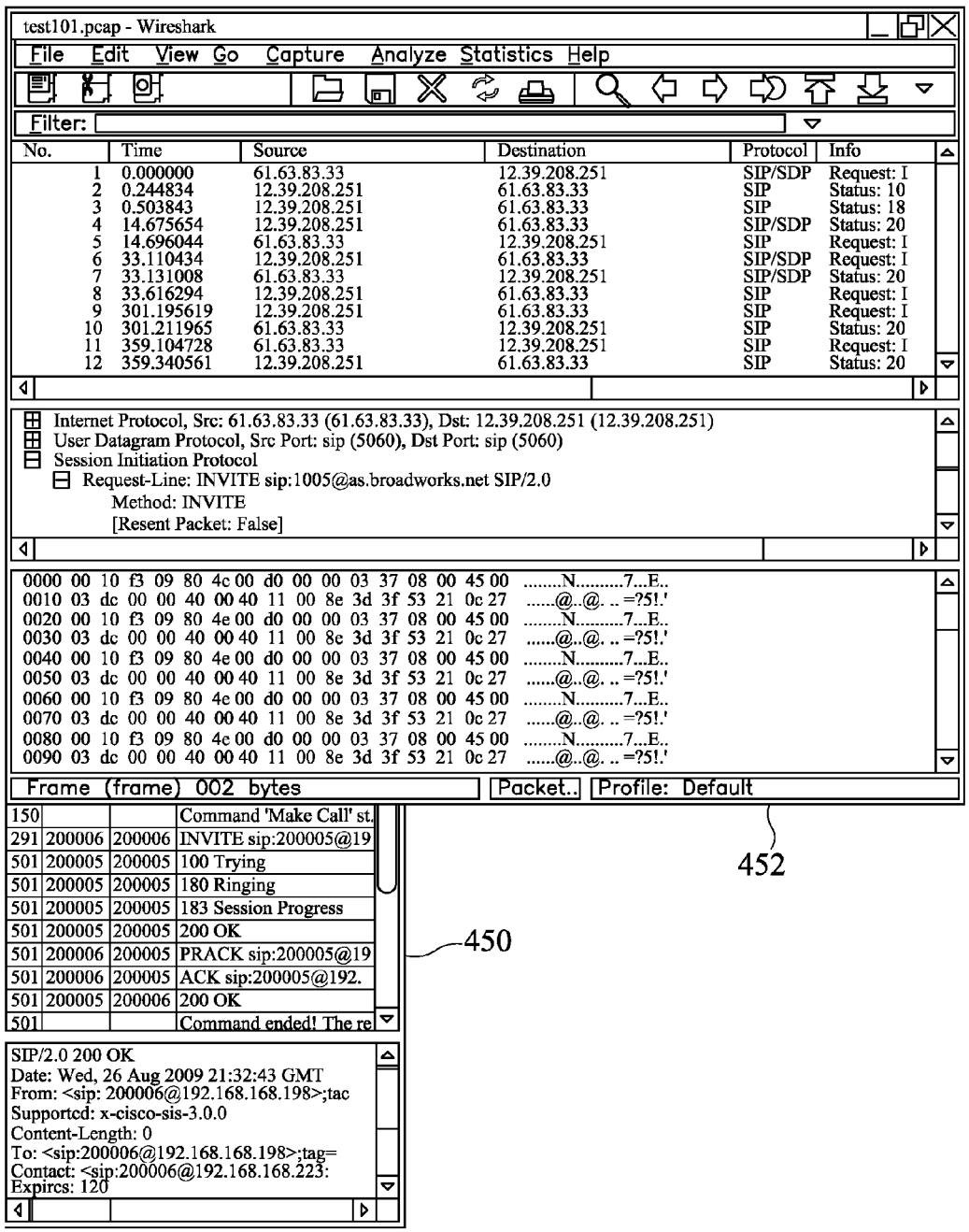
Figure 14A:
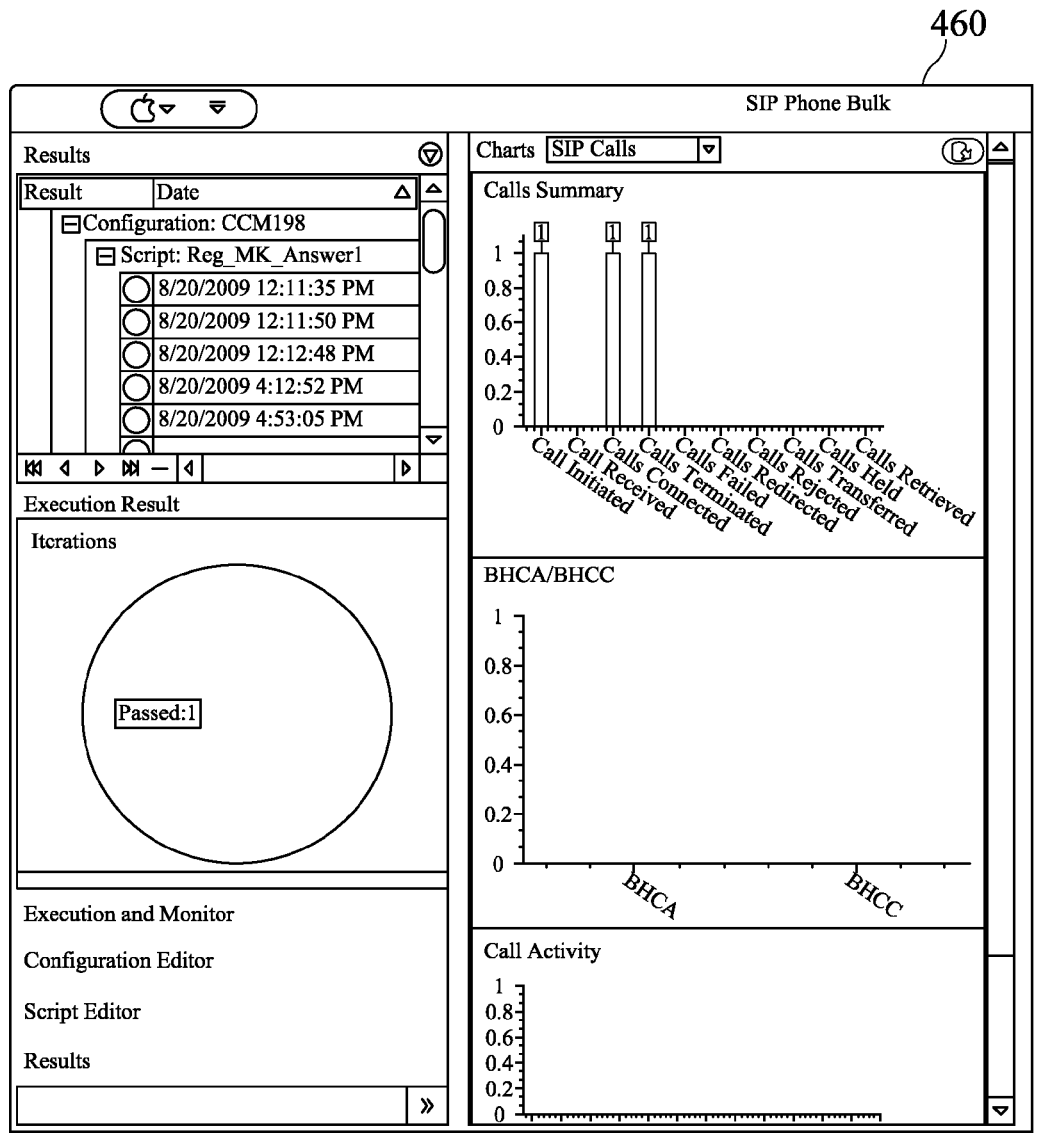
FIG. 14. Integration with existing audio player software.
Figure 14B:
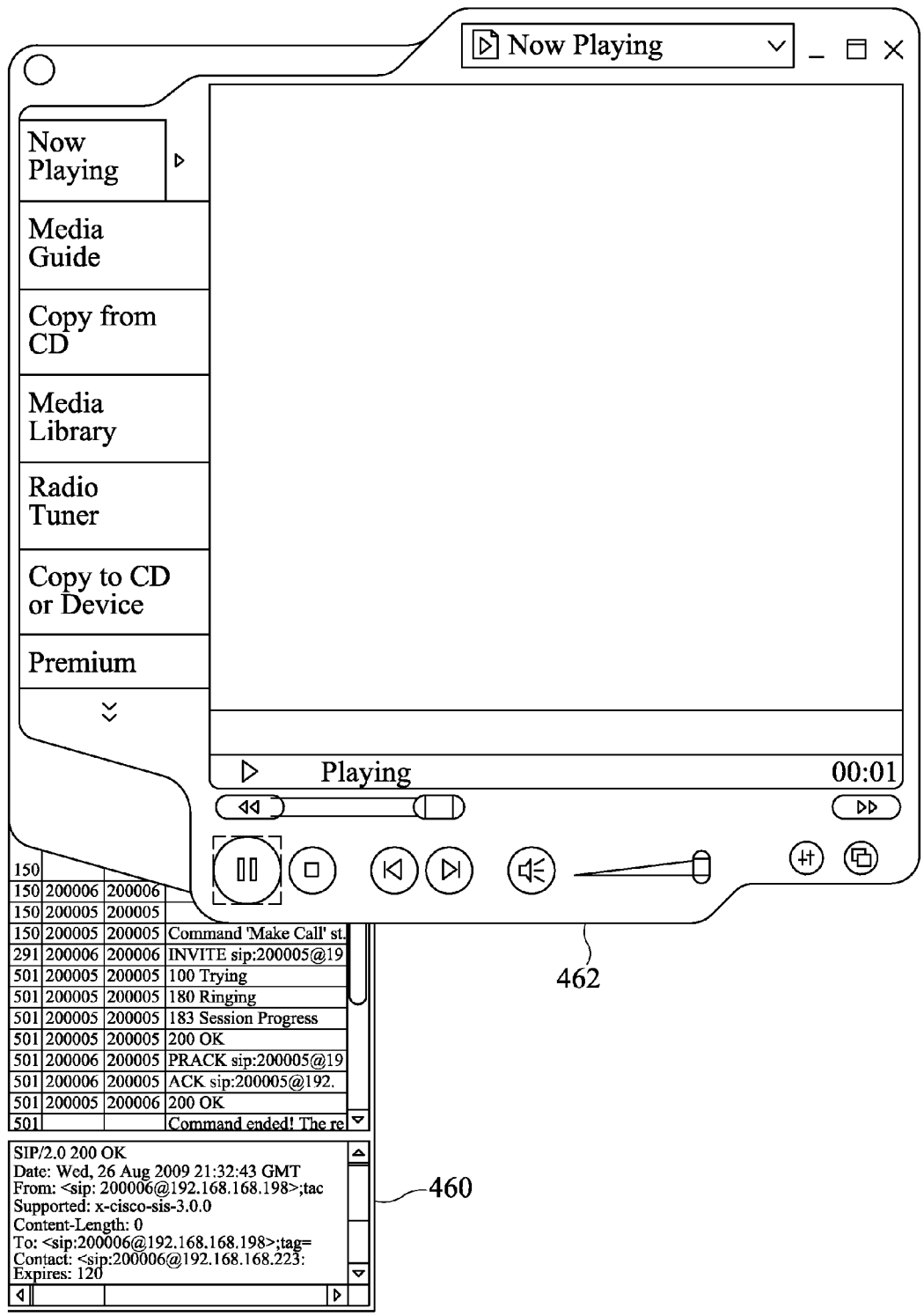

Alternatively or additionally, as shown in FIGS. 13 and 14, the system and method supports integration with third-party laboratory management tools used to control, post-processing, and/or monitor the assessment testing. The tools can be used to provision and configure the devices used in testing, to control the devices during testing, and capture various test results. For example, the present system and method can run on a dedicated host or a third-party server tool such as QTP, WinRunner, and EdenTree with integration, for example, using batch execution of, for example, Visual Basic, TCL, or other CLI scripts.

Illustrative display results of interoperability assessments and illustrative information of the type provided, for example, quality of service measurements, are shown in FIG. 11 for a device that passed the assessment, and in FIG. 12 for a device that failed the assessment. For example, analysis and reporting includes error codes in accordance with test commands, customized pass/fail criteria, and quality of service measurements, including for example, packet loss, jitter, one-way and roundtrip delay, R Factor/MOS Scores, quality of voice, and quality of fax based on various industry tests/standards. Additionally, results can be provided in files such as CSV files.

The presently disclosed system and method can be used for automated interoperability assessment, regression testing, and quality of service testing of Communication Platform or other device, for example softswitches, IP-PBXs, and call managers, with any number of other devices, for example SIP phones, that are emulated by the system and method.

There are many commercial and open source SIP traffic generators in the telecom testing industry at the moment, ranging from basic bulk call generators such as Spirent Abacus 5000, to complex conformance test solutions such as Valid8 SIP Traffic Generation and SIP Device Emulation packages. Although some of SIP traffic generators are able either to generate valid and invalid low level traffic according to IETF recommendations using complex test conformance scenarios or capturing and playing back the actual SIP device recorded traffic, such as Valid8 Replicator Record and Playback Module, none of the SIP testing solutions on the telecom market today uses SIP device profiling for the emulation of an actual SIP Enabled Device by instantiating the standard protocol state-machine with specific behavioral characteristics.

Quality Logic is currently selling FaxLab tester consisting of a T.30 fax emulator that replicates actual analog PSTN fax devices based on static defined device profiles. FaxLab system addresses neither the T.38 Fax over IP testing domain nor a Multi-step Iterative Profiling Process of the T.38 Fax-relay Enabled Device to be emulated.

While the invention has been illustrated and described in detail in the foregoing drawings and description, the same is to be considered as illustrative and not restrictive in character, it being understood that only illustrative embodiments thereof have been show and described and that all changes and modifications that are within the scope of the disclosure are desired to be protected. For example, the disclosed system and method may utilized not only for assessment of IP telephony devices/services, but also for other applications such as IP support of video transmission codecs, encrypted or secure services, and the like.

The invention claimed is:

1. A system for interoperability assessment of a plurality of SIP and T.38 fax-relay enabled devices with a SIP communications platform, comprising:
 a behavioral profiles database including a plurality of behavioral profiles corresponding to the plurality of SIP and T.38 fax-relay enabled devices; and
 a device emulation engine enabled by:
 state machines for the plurality of SIP and T.38 fax-relay enabled devices;
 specified telephony scenarios; and
 behavioral profiles;
 a behavioral analysis engine; and
 traffic analysis rules;
 and wherein the plurality of behavioral profiles is generated by capturing multiple times a SIP terminal call flow, and analyzing device message syntax/signal parameters, message content, device message/signal flow sequence, and signal timing, and storing deviations from the traffic analysis rules as characteristics in the behavioral profile;
 to emulate SIP and Media traffic for each of the plurality of SIP and T.38 fax-relay enabled devices, and determine the interoperability performance of the SIP communications platform with the emulated plurality of SIP and T.38 fax-relay enabled devices.

2. The method of claim 1, wherein the emulation includes using a probabilistic distribution of the signal timing characteristics of the behavior profile.

3. The system of claim 1, further comprising a laboratory management software tool to facilitate the assessment.

4. A method of interoperability assessment of a plurality of SIP and T.38 fax-relay enabled devices with a SIP communications platform, comprising:
 specifying telephony scenarios;
 repeatedly executing the telephony scenarios for each of the plurality of SIP or T.38 Fax-relay enabled devices;
 conducting traffic analysis to observe and record deviations from traffic analysis rules for each of the telephony scenarios for each of the plurality of SIP or T.38 Fax-relay enabled devices;
 generating a plurality of behavioral profiles by capturing multiple times a SIP terminal call flow, and analyzing device message syntax/signal parameters, message content, device message/signal flow sequence, and signal timing;
 and storing the deviations in a behavioral profile for each of the plurality of SIP or T.38 Fax-relay enabled devices.

5. The method of claim 4, wherein the behavioral profile includes characteristics of deviations relating to message syntax, message content, message flow.

6. The method of claim 4, further comprising:
 assessing the interoperability of the SIP communications platform with the plurality of SIP or T.38 Fax-relay enabled devices by:
 connecting the SIP communications platform through an IP network to a device emulation engine;
 emulating the plurality of SIP or T.38 Fax-relay enabled devices for specified telephony scenarios using the behavioral profiles and a device emulation engine;
 conducting traffic analysis to determine assessment results.

7. The method of claim 4, wherein the emulating step includes using a probabilistic distribution of the signal timing characteristics of the behavior profile.

8. The method of claim 4, further comprising the step of employing a laboratory management software tool to facilitate the assessment.

* * * * *